United States Patent [19]

Woodard et al.

[11] Patent Number: 4,864,734
[45] Date of Patent: Sep. 12, 1989

[54] SCALE STABILZER

[76] Inventors: Harry L. Woodard, 109 Alice St., Tuscumbia, Ala. 35674; Billy W. Herring, Rte. 3, Box 22, Killen, Ala. 35645; Curtiss O. Willis, 603 E. Grand Ave., Muscle Shoals, Ala. 35600; Jeffery W. Cavnar, Rte., Box 176, Decatur, Ala. 35603

[21] Appl. No.: 173,922

[22] Filed: Mar. 28, 1988

[51] Int. Cl.$^4$ .............................................. B43L 13/00
[52] U.S. Cl. ........................................ 33/428; 33/770
[58] Field of Search ................... 33/173, 169 B, 428, 33/672, 452, 464, 178 D, 757, 770

[56] References Cited

U.S. PATENT DOCUMENTS 894,498  7/1908  Hills ....................................... 33/428

Primary Examiner—William A. Cuchlinski, Jr.
Assistant Examiner—Thomas B. Will
Attorney, Agent, or Firm—Evelyn M. Sommer

[57] ABSTRACT

A scale holder is provided for securely retaining a scale to permit various measurements to be made. The scale holder includes orthogonally disposed major and minor planar walls on which the scale holder can be securely supported. The scale holder further includes a nonplanar support defined by intersecting generally planar support surfaces to permit the scale holder to be supported on an arcuate or irregular surface. A plurality of scale guides and slots are provided to selectively position a scale in orthogonal or parallel relationship to one or more of the walls of the scale holder. Clamps further are provided to retain the scale in selected position relative to the scale holder.

16 Claims, 3 Drawing Sheets

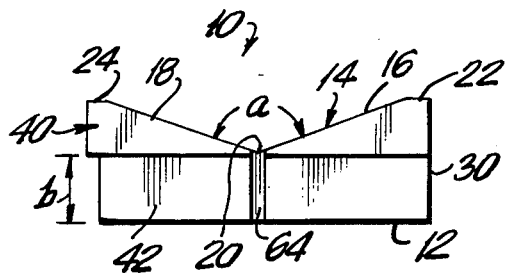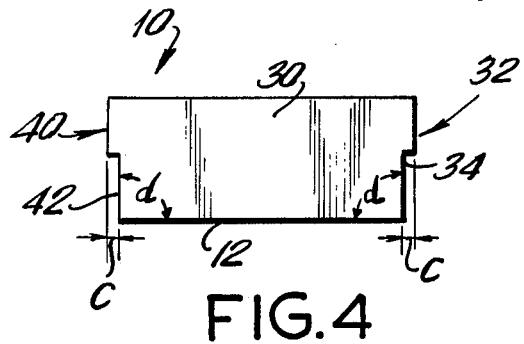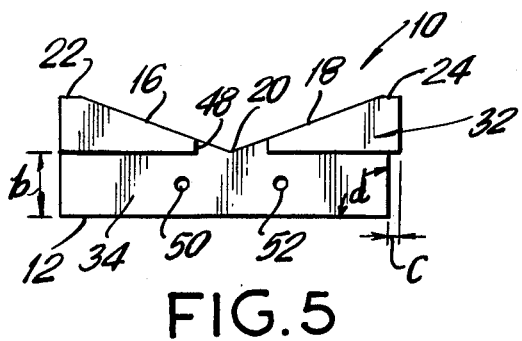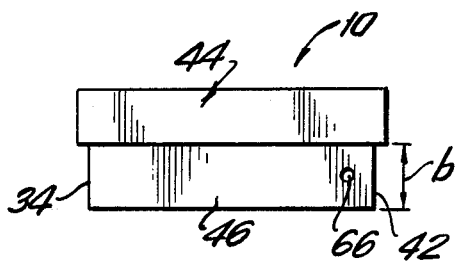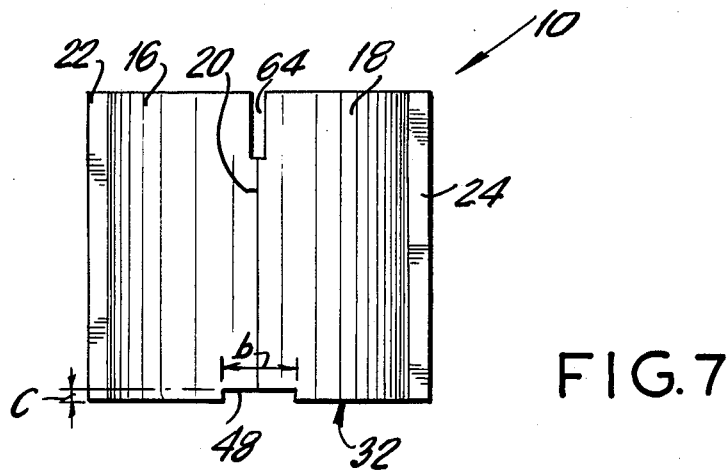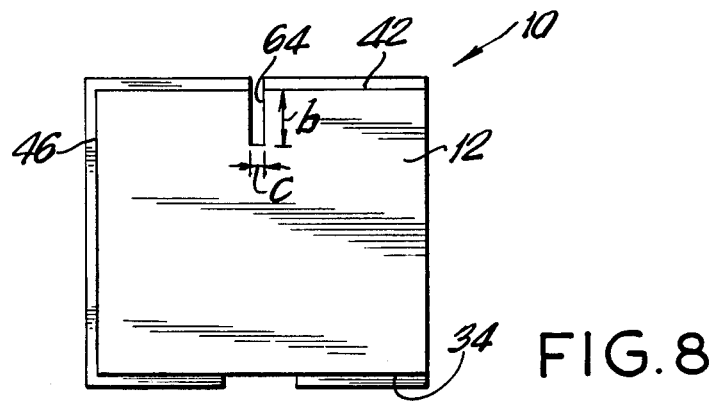

SCALE STABILZER

BACKGROUND OF THE INVENTION

Many manufacturing and industrial processes require periodic precise measurements of structural components relative to one another or to a fixed frame of reference. For example, many industrial machines include moveable components that can shift sufficiently out of a specified position to require periodic adjustment and realignment. In other industrial processes, it may be necessary to mount a piece of stock material at a specified height and/or geometric alignment relative to certain machines that will perform work on the stock material.

The paper industry includes many such examples where machinery parts and stock materials must be periodically aligned. In particular, very large and heavy rolls of paper are often mounted on massive industrial machines for subsequent use and processing. The elevation and alignment of these large rolls of paper must be checked at the start of the process and periodically thereafter. The measurements may include elevational measurements of the cylindrical core at both opposed ends and elevational measurements of the outermost coil at both opposed ends. Such measurements typically may be carried out by placing a scale, generally vertically, next to the roll and using an optical level or similar device at a fixed location spaced from the roll. This may require a large dedicated surveyor's scale with an expensive specially adapted stand, such as a tripod. Alternatively, this may require a more conventional scale and ruler to be held in a vertical position by one employee while a second employee makes readings through an appropriate optical level. This latter technique requires an inefficient use of personnel for making a simple measurement. In situations where two employees are not available, it typically is necessary to rig a temporary and often inaccurate holding apparatus from available equipment.

In many other situations it is necessary to make horizontal measurements. For example, stock material may have to be centered along a spindle or mounted on a spindle or pallet to ensure clearance from other parts of the machine. In these situations a scale may be mounted horizontally on a flat surface, or horizontally on an arcuate surface, such as on the above-described large rolls of paper. Furthermore, the degree of curvature for such arcuate rolls may vary considerably from one measurement to the next.

In most such measurements, it is important to ensure that the scale extends substantially perpendicular or parallel to a particular frame of reference. Thus, it may be desirable to extend a scale perpendicular to a horizontal surface for various vertical measurements, or to extend the scale parallel to a horizontal surface for assessing clearance and alignment.

The prior art includes many devices for holding a scale. For example, U.S. Pat. No. 4,428,122 which issued to Mann on Jan. 31, 1984 shows a generally rectangular block having a V-shaped notch in one side and having an aperture extending entirely therethrough to intersect the apex of the V-shaped notch. The aperture in the block is dimensioned to receive a plug which in turn is configured to receive a measurement scale. The surface of the block into which the V-shaped notch extends defines a base, and can be positioned on a planar surface with the scale extending from the opposite side of the block. Alternatively, the V-shaped notch can be mounted to an arcuate surface, such as a shaft. The structure shown in U.S. Pat. 4,428,122 is limited to measurement functions where the scale exactly bisects the V-shaped notch. Thus, although the apparatus of U.S. Pat. No. 4,428,122 may be useful for making certain vertical measurements, it is of limited versatility, and cannot address many of the measurement and alignment needs encountered in the above-described industrial manufacturing processes. Furthermore it will not enable placement of the scale immediately adjacent a vertical surface.

Another known scale holder is shown in U.S. Pat. No. 3,386,175 which issued to Stockman on June 4, 1968. The apparatus shown in U.S. Pat. No. 3,386,175 is operative to move various scales through spacial orientations to achieve a desired spacial orientation of a form. This apparatus is extremely complex and costly, and would be of limited usefulness in many industrial processes.

U.S. Pat. No. 4,146,969 issued to Chaires on Apr. 3, 1979 and shows a base that can be used in either of two orientations to support a surveyor's rod. The base, in its plan view, is of broad rectangular configuration, but its cross-sectional view, defines a narrow generally trapezoidal shape. The base further includes a pair of mounting projections, with one mounting projection extending from one broad base and with the other mounting projection extending from one of the narrow bases. The mounting projections are adapted to receive a special surveyor's rod having an aperture therein. The broad rectangular surface of the base can be laid flat on a generally planar surface with the surveyor's rod extending from the oppositely directed projection. Alternatively, the base can be rotated 90° and can be driven partially into the ground such that the surveyor's rod is mounted to the projection extending from the narrow face of the base. The apparatus shown in U.S. Pat. No. 4,146,969 is limited to scales having an aperture therein to receive one of the two projections extending therefrom. Thus, this apparatus would be of limited usefulness in most industrial manufacturing operations.

The prior art includes many other devices to facilitate the vertical mounting a scale, such as a surveyor's rod. For example, U.S. Pat. No. 4,339,880 which issued to Hall on July 20, 1982 shows a tripod for holding a surveyor's rod in a vertical position eccentric to the apex of the tripod. U.S. Pat. No. 3,239,176 shows a different tripod for mounting a scale generally through the center of the apex of the tripod. U.S. Pat. No. 3,911,589 which issued to Myeress on Oct. 14, 1975 shows a base to hold a scale and including an array of leveling screws to ensure that the scale extends generally vertically. Other structures for holding surveryor's rods or other targets in a vertical position are shown in U.S. Pat. No. 4,494,870 which issued to Hentschel on Jan. 22, 1985 and U.S. Pat. No. 4,681,439 which issued to Shoemaker on July 21, 1987. As with the previously described structures, these various scale holders are of limited versatility and would be impractical for many industrial applications.

U.S. Pat. No. 4,333,244 issued to Bailey on June 8, 1982 and shows a tripod-like structure similar to those described above, but adapted to hold a level in a horizontal position. Once again, this prior art apparatus is of limited versatility and would be of little use in many industrial or manufacturing operations. The prior art further includes devices for fixing a scale generally parallel to a planar surface. For example, U.S. Pat. No. 4,378,638 which issued to Harder on Apr. 5, 1983 shows a clamp for fixing a surveyor's rod parallel to a mounting structure such as an elongated pole. U.S. Pat. No. 4,498,245 issued to Mayor on Feb. 12, 1985, and shows a clamping apparatus for securing a scale parallel to an assembly jig.

U.S. Pat. No. 4,085,512 issued to Bod et al. on Apr. 25, 1978 and shows a hand-held apparatus for determining the straightness of a lumber cut. The apparatus merely is intended to ensure that a scale is held orthogonal to the surface of lumber to be measured.

The above-described prior art shows various structures for holding a scale in a specified alignment for a specific measurement function. While most of these devices may be useful for their particular intended functions, they are of substantially limited versatility, and cannot accommodate the broad array of measurement needs that are likely to be encountered in industrial workplaces.

In view of the above, it is an object of the subject invention to provide an apparatus for precisely holding a scale in each of a plurality of different alignment positions.

It is another object of the subject invention to provide a simple apparatus for precisely holding a scale in at least two orthogonally disposed alignments.

It is a further object of the subject invention to provide an apparatus for holding a scale either orthogonal to or parallel to either a planar surface or an arcuate surface.

It an additional object of the subject invention to provide a scale-holding apparatus that is inexpensive to manufacture and easy to use.

Yet another object of the subject invention is to provide a scale holder that can accept commercially available measurement scales.

SUMMARY OF THE INVENTION

The precision scale holder of the subject invention defines a generally polyhedral block having a plurality of surfaces on which the scale holder may be mounted, and slots, grooves, guides or recesses in which a scale may be securely and accurately retained. The orientation of the surfaces of the scale holder and the location and orientation of the slots, guides, recesses and such formed therein are selected to enable a substantial number of measurement types to be performed.

The scale holder comprises a major substantially planar wall which defines the portion on which the scale holder is supported for many measuring operations. The major planar wall may be of generally rectangular configuration with approximately equal length and width dimensions.

The portion of the scale holder opposite the major planar wall may define a nonplanar support comprising a pair of intersecting support surfaces. More particularly, the nonplanar support of the scale holder comprises an elongated inwardly directed corner to permit the scale holder to be mounted on a nonplanar surface, such as a roll of paper, as described further herein. The nonplanar support may comprise a pair of co-planar spaced apart, generally parallel, supports which lie in a plane substantially parallel to the major planar wall of the scale holder. The spaced apart supports of the nonplanar support provide a convenient surface for mounting the scale holder in environments where minor irregularities in the contour of a floor or such may be encountered. In particular, these parallel co-planar supports minimize the possibility of the scale holder wobbling due to an imperfect floor or the like.

The scale holder may further comprise a minor planar wall intersecting and orthogonal to the major planar wall. As will be explained further below, the minor planar wall provides a supporting surface for the scale holder that is smaller than the supporting surface defined by the major planar wall thereof. The minor planar wall further enhances the versatility of the scale holder. For example, the minor planar wall may be positioned on a floor in a corner adjacent a wall or a machine part, such that the major planar wall abuts the adjacent machine, wall or the like. Furthermore, the minor planar wall is particularly useful in the many industrial machine environments where only a small supporting surface for such a scale holder is available.

The scale holder may further comprise first and second scale guides having planar bases which are orthogonal to both the major and minor planar walls. The first and second scale guides may define rabbet grooves, the dimensions of which may be selected in accordance with the dimensions of the scale used with the scale holder. A third scale guide may similarly be disposed on a side of the scale holder opposite the minor planar wall but intersecting and orthogonal to the major planar wall. Thus, the third scale guide may define a rabbet groove orthogonal to the first and second scale guides.

The scale holder may further comprise first and second slots extending between the major planar wall and the nonplanar support of the scale holder. More particularly, the first and second scale slots may be orthogonal to the major planar wall and may be dimensioned to securely receive a scale therein. The first slot may be dimensioned to slideably receive the width of the scale, while the second slot may be dimensioned to slideably receive the thickness of the scale. Thus, the first and second slots have their respective long axes perpendicular to one another. The scale holder may further comprise means for retaining the scale in the first and second scale slots thereof. The retaining means may comprise bar clamps, clamping bolts or the like.

In use, the scale holder is placed on a selected one or more of its support walls in accordance with the environment in which it is employed, and further in accordance with the particular type of measurement required. The scale is then properly positioned in a selected one of the scale guides or scale slots. If necessary, the scale may be retained in this position by appropriate securing or clamping means. Measurements can then be made by a technician without directly holding the scale. Furthermore the scale holder ensures that the scale is appropriately perpendicular or parallel to the surface on which the scale holder is supported.

BRIEF DESCRIPTION OF THE DRAWINGS

FIG. 3 is an end elevational view of the subject scale holder.

FIG. 4 is a side elevational view of the scaled holder.

FIG. 5 is an end elevational view of the scale holder viewed from the end opposite the end depicted in FIG. 3.

FIG. 6 is a side elevational view of the scale holder as viewed from the side opposite that shown in FIG. 4.

FIG. 7 is a top plan view of the scale holder.

FIG. 8 is a bottom plan view of the scale holder.

DETAILED DESCRIPTION OF THE PREFERRED EMBODIMENT

Figure 1:
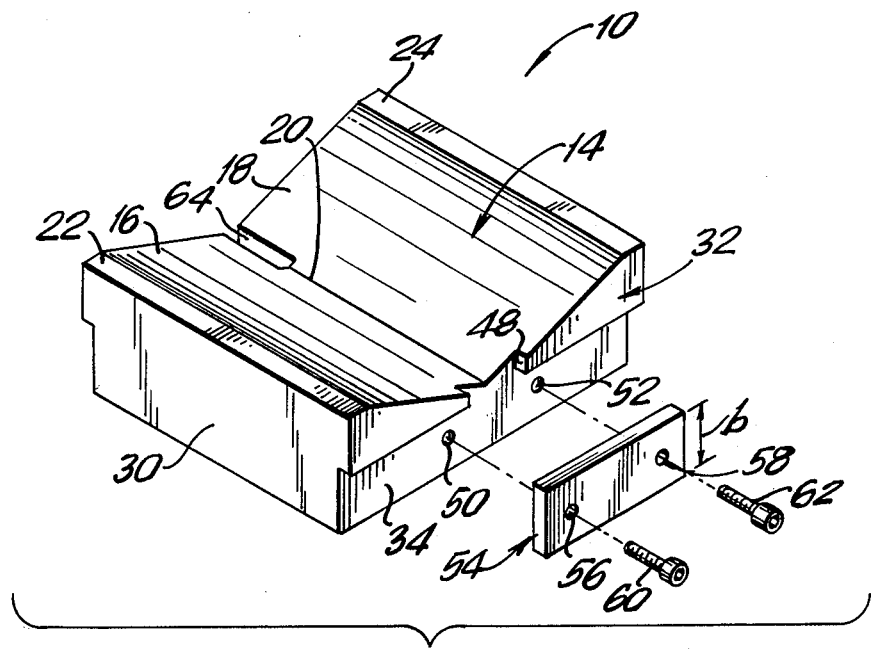
FIG. 1 is an exploded perspective view of the scale holder of the subject invention.
Figure 2:
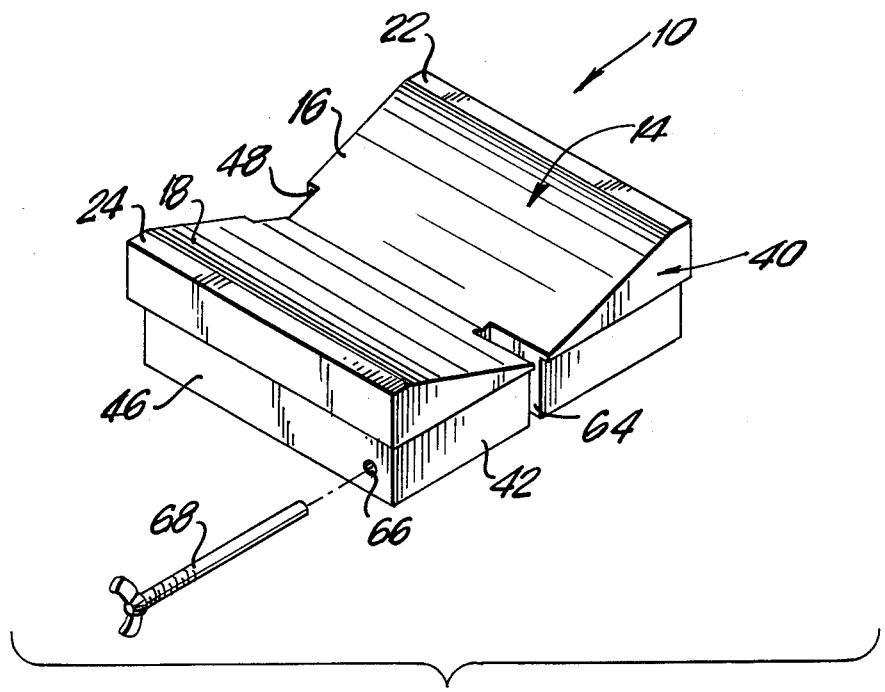
FIG. 2 is an exploded perspective view of the scale holder viewed from the end opposite that depicted in FIG. 1.

The precision scale holder of the subject invention is identified generally by the numeral 10 in FIGS. 1–8. The scale holder 10 is formed from a solid metallic material machined to include a plurality of supporting surfaces, and to include a plurality of precise means for retaining a scale, as explained further herein.

The scale holder 10, as shown most clearly in FIG. 8 includes a generally rectangular major planar wall 12 which defines the wall upon which the scale holder will be supported for many measurement procedures. The side of the scale holder 10 generally opposite the major planar wall 12 defines a nonplanar support identified generally by the numeral 14 as shown in FIGS. 1–3, 5 and 7. More particularly, the nonplanar support 14 is defined by intersecting planar support surfaces 16 and 18. The planar support surfaces 16 and 18 are angularly aligned to one another and intersect at an elongated inwardly directed corner 20 to define a concavity on the side of the scale holder 10 opposite the major planar wall 12. As will be explained in greater detail below, this angular orientation of the planar support surfaces 16 and 18 permits the scale holder to be securely supported on an arcuate surface, such as a cylinder, a large roll of paper or the like. The angular alignment of the support surfaces 16 and 18 will depend in part upon the intended end use of the precision scale holder. In the typical situation the angle "a" between the surfaces 16 and 18, as shown in FIG. 3, will be between 120° and 160°, with the preferred angle for most industrial applications being approximately 135°.

The nonplanar support 14 of the scale holder 10 further comprises elongated parallel supports 22 and 24 which intersect the respective planar support surfaces 16 and 18 on the portions thereof most distant from the interior corner 20. In particular, the support surfaces 22 and 24 are co-planar and are parallel to the major planar wall 12. Thus, the co-planar supports 22 and 24 define an alternate means for supporting the scale holder 10, as noted above and explained further below.

The scale holder 10 further comprises a minor planar wall 30 which is of planar configuration and extends orthogonally between the major planar wall 12 and the planar support surface 22. The minor planar wall 30 defines a surface for supporting the scale holder during many measurement procedures as explained further below.

Although the remaining sides of the scale holder 10 can function as support surfaces in certain situations, the primary function of these remaining sides is to enable secure and precise retention of the scale in any of a plurality of different orientations. In particular, the scale holder 10 includes a first end identified generally by the numeral 32 and shown most clearly in FIGS. 1 and 5. The first end 32 of the scale holder 10 is characterized by a first scale guide 34 which effectively defines a rectangular rabbet groove adjacent to the major planar wall 12. The first scale guide has a width "b" as shown in FIG. 5, substantially equal to the width of the scale to be used with the scale holder 10. Additionally, as shown in FIG. 4, the first scale guide 34 defines a depth "c" substantially equal to the thickness of the scale used with the scale holder 10. The base of the first scale guide 34 intersects the major planar wall 12 of scale holder 10 at an angle "d" substantially precisely equal to 90°.

The second end 40 of the scale holder 10 is disposed generally opposite the first end 32 and is of substantially similar shape and dimension. In particular, the second end 40 is characterized by a second scale guide 42 which also defines a rectangular rabbet groove having a width "b" and a depth "c" for accurately receiving a scale. Also, the base of the second scale guide 42 defines a substantially precise right angle "d" with respect to the major planar wall 12.

The scale holder 10 further comprises a side indicated generally by the numeral 44 and disposed generally opposite the minor planar wall 30. The side 44 extends between the first and second opposed ends 32 and 40 of the scale holder 10 and is characterized by a third scale guide 46. The third scale guide 46 is similar to the first and second scale guides 34 and 42, and effectively defines a rectangular rabbet groove. As with the first and second scale guides 34 and 42, the third scale guide has a width "b" and a depth "c" corresponding to the cross-sectional dimensions of the scale used with scale holder 10. Additionally, the base of the third scale guide 46 is aligned substantially precisely at a right angle "d" to the major planar wall 12.

The scale holder 10 further comprises a first scale slot 48 disposed generally at the first end 32 thereof. The first scale slot 48 has a width as measured parallel to the first scale guide 34 of dimension "b" which is substantially equal to the width of the scale to be used with the scale holder 10. Additionally, the first scale slot has a depth "c", as measured parallel to the interior corner 20 which is equal to the thickness of the scale to be employed with the scale holder 10. As a result, a scale (not shown) can be precisely received in the first scale slot 48 with one of its major surfaces in abutting face-to-face relationship with the base of the first scale slot 48.

The first end 32 of the scale holder 10 is further characterized by threaded apertures 50 and 52 extending into the portion of the first end 32 defined by the first scale guide 34. The threaded apertures 50 and 52 are disposed to lie on opposite sides of the first scale slot 48, as shown most clearly in FIG. 5. The scale holder 10 further comprises a generally planar bar clamp 54 having apertures 56 and 58 extending therethrough at locations to be placed in register with the threaded apertures 50 and 52 in the first end 32. The bar clamp 54 has a width "b" substantially equal to the width of the first scale guide 34. Threaded bolts 60 and 62 are further provided to pass through the apertures 56 and 58 and to be threadedly engaged in the apertures 50 and 52. The bar clamp 54 and the threaded bolt 60 and 62 enable a scale (not shown) to be securely clamped into the first scale slot 48.

The scale holder 10 further comprises a second scale slot 64 extending into the second end 40 thereof. More particularly, the second scale slot 64 is symmetrical to the longitudinal interior corner 20 and extends into the scale holder 10 a distance "b" as measured parallel to the interior corner 20 and from the base of the second scale guide 42. Additionally, the second scale slot 64 has a width "c". As a result, the second scale slot 64 is dimensioned to precisely receive a scale therein. The scale holder 10 further comprises a threaded aperture 66 extending into the side 44 thereof generally in line with the third scale guide 46 formed therein. More particularly, the threaded aperture 66 is disposed at a location on the side 44 to intersect the second scale slot 64. The scale holder 10 further comprises an elongated clamping bolt 68 which is dimensioned to be threadedly received in the aperture 66. The clamping bolt 68 is dimensioned to extend at least partly into the second scale slot 64, such that the clamping bolt 68 is operative to securely retain a scale in the second scale slot 64.

Figure 9:
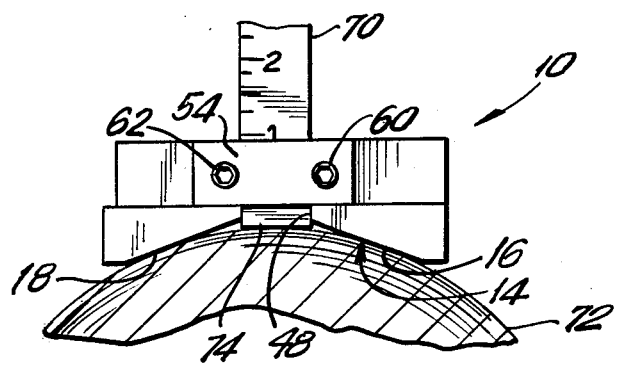
FIG. 9 is an end elevational view of the scale holder and a scale shown in a first environment.

The scale holder 10 can be used in a plurality of different orientations and environments, examples of which are depicted in FIGS. 9–12. In particular, FIG. 9 depicts a scale holder 10 used with a scale 70 to make a measurement relative to an arcuate surface such as a roll of paper 72. In this instance, the scale holder 10 is supported on its nonplanar support 14 such that the planar surfaces 16 and 18 are in abutting generally tangential relationship to the roll of paper 72. The scale 70 is securely retained in the first scale slot 48 by the bar clamp 54 and the bolts 60 and 62. The scale 70 is depicted as being positioned in the first scale slot 48 such that the end 74 of scale 70 is in abutting tangential relationship to the outer cylindrical circumference of the roll of paper 72. However, it will be understood that the scale holder 10 can be positioned adjacent an axial end of the roll 72 such that the scale 70 can extend adjacent the axial end of the roll 72 to make measurements, such as the radius or diameter of the roll 72.

Figure 10:
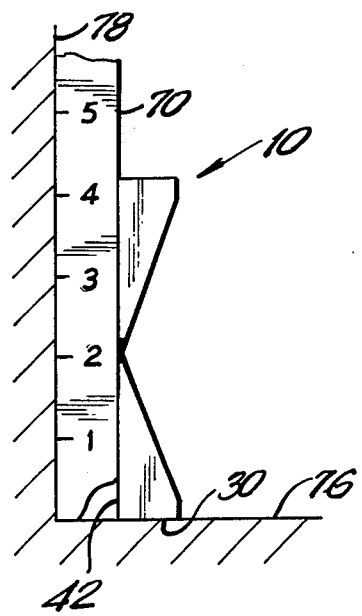
FIG. 10 is an end elevational view of the scale holder and a scale shown in a second environment.

FIG. 10 shows the scale holder 10 positioned adjacent a floor 76 and a wall 78. More particularly, the minor planar wall 30 is securely supported on the floor 76, while the major planar wall 12 is in abutting face-to-face relationship with the wall 78. The scale 70 then is placed in the second scale guide 42, and is held in position against the wall 78 to make vertical measurements along the wall 78. It is to be understood, however, the floor 76 and the wall 78 are intended to represent any orthogonally aligned surfaces, such as a piece of stock material or a roll of paper mounted on a floor or machine part.

Figure 11:
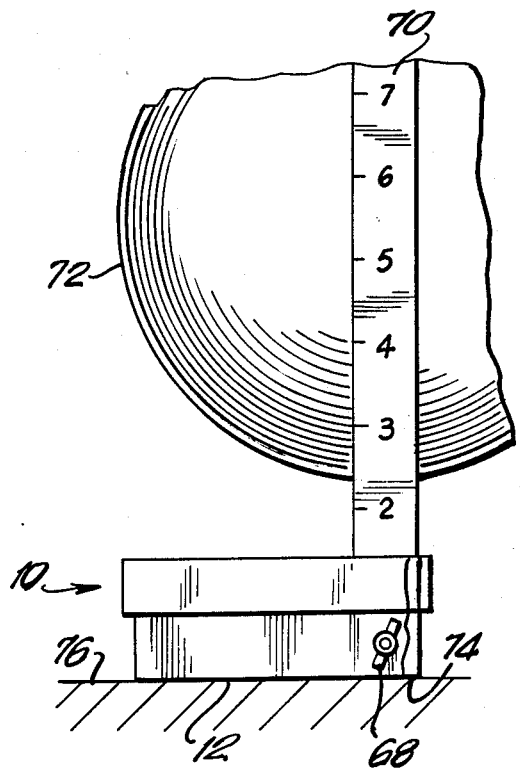
FIG. 11 is a side elevational view of the scale holder and a scale shown in a third environment.

FIG. 11 shows the scale holder 10 with its major planar wall 12 mounted on the floor 76. In this situation, the scale 70 is securely retained in the second scale slot 64 with the end 74 of the scale 70 abutting the floor 76. This orientation permits measurements to be made at various locations relative to the floor 76, such as the clearance between the roll 72 and floor 76.

Figure 12:
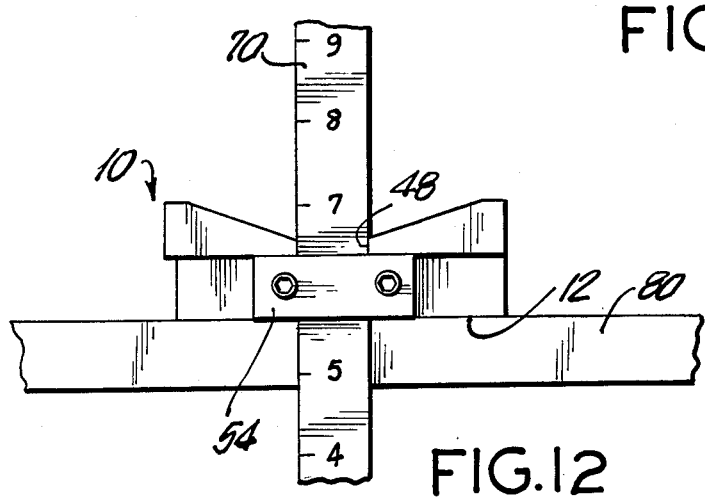
FIG. 12 is an end elevational view of the scale holder and a scale used in a fourth environment.

FIG. 12 shows still another example of the use of the scale holder 10. In this example, the major planar wall 12 is supported on platform 80, while the scale 70 is secured in the first scale slot 48 by the bar clamp 54. In particular, the scale holder 10 is positioned such that the scale 70 extends below the platform 80 to enable a variety of measurements to be made. For example, the elevation of the platform 80 relative to a floor or other frame of reference can be measured, or alternatively, the distance between a structure below platform 80 and a second structure above platform 80 can be measured.

In summary, a scale holder is provided for securely holding a scale in any of a plurality of different positions to facilitate a wide range of different measurements.

The scale holder includes orthogonally aligned major and minor planar walls on which the scale holder can be supported. The scale holder further includes a nonplanar support to permit the scale to be supported on either an arcuate surface or an irregular surface. The scale holder is provided with a plurality of scale guides to permit scales to be held parallel or orthogonal to selected ones of the major and minor planar walls. The scale holder further includes at least one slot for securely retaining a scale in a substantially upright position relative to the major planar wall and the nonplanar support. Clamp means for securely retaining the scale in the slots are provided.

While the invention has been described with respect to a preferred embodiment, it is understood that various changes can be made without departing from the scope of the invention as defined by the appended claims. In particular, it is to be understood that the scale holder can be used for various measurements beyond the few illustratively presented above.

What is claimed is:

1. A scale stabilizer for securely retaining a measurement scale, said scale stabilizer defined by a block having a major planar wall, a minor planar wall extending orthogonally from said major planar wall, and an angular support defining a side of said scale stabilizer generally opposite said major planar wall, said angular support comprising a pair of intersecting support surfaces defining an elongated inwardly directed corner on the side of said scale stabilizer opposite said major planar wall, said scale stabilizer further comprising a plurality of guides angularly aligned to one another and extending parallel to said major planar wall for securely retaining a scale therein parallel to said major planar wall, each of said intersecting support surfaces of said angular support being adapted to engage an arcuate surface when said scale stabilizer is stabilizing a scale.

2. A scale stabilizer as in claim 1 wherein said plurality of guides extending parallel to said major planar wall comprise a plurality of generally rectangular rabbet grooves adjacent to the major planar wall, each said rabbet groove having a width and depth substantially corresponding to the dimensions of a scale to be used with said scale stabilizer.

3. A scale stabilizer as in claim 1 further comprising a slot dimensioned to receive the scale therein, said slot being aligned to position said scale generally orthogonal to the major planar wall.

4. A scale stabilizer as in claim 3 wherein said slot comprises clamp means for securely retaining a scale therein.

5. A scale stabilizer as in claim 4 comprising a plurality of said slots for retaining the scale, each said slot having a major dimension, with the major dimensions of said slots being generally orthogonal to one another.

6. A scale stabilizer as in claim 5 wherein the clamp means of at least one said slot comprises a bar clamp engagable with said block to retain said scale in said slot.

7. A scale stabilizer as in claim 5 wherein the clamp means of at least one said slot comprises a clamping bolt engagable with said block to retain the scale in said slot.

8. A scale stabilizer as in claim 1 wherein the support surfaces intersecting to define the angular support are generally planar, and intersect at an angle of between approximately 120° and 160°.

9. A scale stabilizer as in claim 8 wherein the elongated inwardly directed corner defined by said intersecting planar support surfaces is substantially parallel to said major planar wall.

10. A scale stabilizer as in claim 1 further comprising a pair of generally parallel co-planar supports on the side of said scale stabilizer opposite said major planar wall and disposed on opposite sides of said intersecting surfaces thereof.

11. A measurement apparatus comprising:
an elongated linear measurement scale of generally rectangular cross-section, with major and minor cross-sectional dimensions; and
a scale stabilizer defined by a block with a plurality of intersecting exterior surfaces comprising a major planar wall, a minor planar wall intersecting said major planar wall and orthogonal thereto, an angular support defining a side of said scale stabilizer generally opposite said major planar wall, said angular support being formed by a pair of generally planar intersecting surfaces defining an elongated inwardly directed corner in said scale stabilizer, first and second ends generally parallel to one another and extending between said major planar wall and said angular support, said first and second ends having first and second scale guides respectively defining generally rectangular rabbet grooves adjacent the major planar wall and having widths and depths substantially equal to the respective major and minor cross-sectional dimensions of said scale, said first end further having a first scale slot generally orthogonal to said major planar wall and having a width substantially equal to the major cross-sectional dimension of said scale and a depth approximately equal to the minor cross-sectional dimension of said scale, said second end of said scale stabilizer having a second scale slot extending into said block generally orthogonal to said major planar wall and to said first scale slot and having a depth substantially equal to the major cross-sectional dimension of said scale and a width substantially equal to the minor cross-sectional dimension of said scale, whereby said scale can be securely positioned in either said first or second scale guide or in said first or second scale slot.

12. A measurement apparatus as in claim 11 further comprising first and second clamp means for securely retaining the scale in said first or second scale slots.

13. A measurement apparatus as in claim 12 wherein said first clamp means comprises a clamp bar securely but releasably engagable with said block adjacent to said first scale slot.

14. A measurement apparatus as in claim 12 wherein said scale stabilizer comprises a threaded aperture in said block intersecting said second scale slot, and wherein said second clamp means comprises a threaded clamping bolt engagable with said threaded aperture in said block to securely clamp the scale in said second scale slot.

15. A measurement apparatus as in claim 11 further comprising a pair of co-planar supports generally parallel to the major base wall and disposed on opposite respective sides of the intersecting surfaces defining the angular support.

16. A measurement apparatus as in claim 11 wherein said block is formed from a solid piece of metallic material.

* * * * *